US012339936B2

(12) United States Patent
Gallagher et al.

(10) Patent No.: US 12,339,936 B2
(45) Date of Patent: Jun. 24, 2025

(54) SYSTEM AND METHODS FOR PROTECTING, MONITORING, AND REPORTING USE OF CONTENT

(71) Applicant: ImageShield LLC, Fairfax, VA (US)

(72) Inventors: Michael Gallagher, Fairfax Station, VA (US); Vinay Kumar Thadem, Fairfax, VA (US)

(73) Assignee: ImageShield LLC, Fairfax, VA (US)

( * ) Notice: Subject to any disclaimer, the term of this patent is extended or adjusted under 35 U.S.C. 154(b) by 327 days.

(21) Appl. No.: 17/721,940

(22) Filed: Apr. 15, 2022

(65) Prior Publication Data

US 2022/0342962 A1 Oct. 27, 2022

Related U.S. Application Data

(60) Provisional application No. 63/177,609, filed on Apr. 21, 2021.

(51) Int. Cl.
*G06F 21/16* (2013.01)
*G06F 21/10* (2013.01)

(52) U.S. Cl.
CPC .............. *G06F 21/16* (2013.01); *G06F 21/10* (2013.01)

(58) Field of Classification Search
CPC .................................. G06F 21/16; G06F 21/10
See application file for complete search history.

(56) References Cited

U.S. PATENT DOCUMENTS

| 6,182,218 B1 * | 1/2001 | Saito | ................. H04N 21/4882 |
| | | | 348/E7.063 |
| 7,801,817 B2 * | 9/2010 | Saito | ..................... G06Q 10/10 |
| | | | 705/52 |

(Continued)

FOREIGN PATENT DOCUMENTS

| EP | 880088 A2 * | 11/1998 | ............. G06F 21/10 |
| EP | 3933763 A1 * | 1/2022 | ............. A61B 5/445 |

(Continued)

OTHER PUBLICATIONS

International Search Report dated Jul. 28, 2022, issued in International Application No. PCT/US2022/025596 (3 pages).

(Continued)

*Primary Examiner* — Gary S Gracia
(74) *Attorney, Agent, or Firm* — Lathrop GPM LLP; Alex Shtraym

(57) ABSTRACT

The invention relates generally to a system and methods for protecting content, and more particularly to a system and methods for monitoring and reporting use of content to prevent and redress misuses of the same or similar content. The system may be configured to receive content from a registered user either directly from a client device or indirectly from a third party platform. That content may be processed and assigned a priority score based on one or more parameters. Once processed, a monitoring process may be initiated to scan a network for use of the same or similar content. Instances of use may be recorded and used to produce a report including one or more selectable actions in response to each instance of use. Advantageously, the system may be configured to output a report to a user efficiently and effectively and further provide the user with one or more recommendations.

20 Claims, 14 Drawing Sheets

(56) References Cited

U.S. PATENT DOCUMENTS

| | | | |
|---|---|---|---|
| 9,154,491 B1* | 10/2015 | Leske | H04L 63/08 |
| 11,159,534 B1* | 10/2021 | Arino de la Rubia | G06Q 50/01 |
| 2002/0069098 A1 | 6/2002 | Schmidt | |
| 2006/0167855 A1 | 7/2006 | Ishikawa et al. | |
| 2008/0059426 A1 | 3/2008 | Brock et al. | |
| 2008/0109369 A1 | 5/2008 | Su et al. | |
| 2008/0155701 A1 | 6/2008 | Martinez et al. | |
| 2012/0291135 A1 | 11/2012 | Peled et al. | |
| 2013/0166492 A1 | 6/2013 | Tradelli et al. | |
| 2015/0278024 A1* | 10/2015 | Barman | H04L 67/61 707/634 |
| 2015/0305689 A1* | 10/2015 | Gourmelon | G16H 50/20 600/301 |
| 2018/0041571 A1* | 2/2018 | Rogers | H04L 67/104 |
| 2018/0268337 A1* | 9/2018 | Miller | G06Q 10/06316 |
| 2018/0285827 A1* | 10/2018 | Dotan-Cohen | G06Q 10/063 |
| 2018/0300756 A1* | 10/2018 | Saxena | G06Q 30/0255 |
| 2020/0153521 A1* | 5/2020 | Nelson | H04H 60/64 |
| 2020/0154169 A1* | 5/2020 | Estes | G06F 21/105 |
| 2020/0210752 A1* | 7/2020 | Shin | H04L 63/20 |
| 2023/0230075 A1* | 7/2023 | Aiello | H04L 63/102 705/75 |

FOREIGN PATENT DOCUMENTS

| | | | | |
|---|---|---|---|---|
| JP | 2014215618 A | * | 11/2014 | G06F 12/16 |
| WO | WO-2018029286 A1 | * | 2/2018 | A61B 5/0053 |

OTHER PUBLICATIONS

Jonathan Bailey, "Copygator: A Game Changer?," Plagiarismtoday, Jan. 20, 2009.

Julia Alexander, "YouTube can now warn creators about copyright issues before videos are posted," The Verge, Mar. 17, 2021.

* cited by examiner

SYSTEM AND METHODS FOR PROTECTING, MONITORING, AND REPORTING USE OF CONTENT

CROSS-REFERENCE TO RELATED APPLICATIONS

This application claims benefit of U.S. Application No. 63/177,609 filed on Apr. 21, 2021, which is incorporated by reference in its entirety.

FIELD OF INVENTION

The invention relates generally to a system and methods for protecting content, and more particularly to a system and methods for monitoring and reporting use of content to prevent and redress misuse of the same or similar content.

BACKGROUND OF THE INVENTION

In today's digital world, sharing content is common practice, be it via traditional communication mediums (email and SMS), Web platforms (blogs, forums, and chat), online media distribution channels (YouTube™), and social media platforms, such as Facebook™, LinkedIn™, Twitter™, and Instagram™.

Content that is distributed through the various channels is subject to misuse, such as copying and redistribution that can cause harm to the owner, particularly when misappropriated images capture candid or potentially embarrassing moments. Other concerns for the misuse of content include unauthorized commercial use, cyber-bullying, impersonation, and the like.

The unauthorized use of content is often difficult to detect. Conventional systems may detect the unauthorized use of content by tabulating downloads from the original source. If there are an excessive amount of downloads, these conventional systems may determine that there is a high likelihood that the content is being used by others and inform the owner of potential unauthorized use. However, this approach is often time consuming, expensive, and computationally-intensive.

Accordingly, there is a need for a system and methods for monitoring uploaded content, reporting use by others of the same or similar content efficiently and effectively, and providing the user with one or more actions to prevent and redress misuse of the content. The present invention satisfies this need.

SUMMARY

The present disclosure is generally directed to a platform-specific technical system and methods for the protection of digital media and content. Features of the system may include watermarking, iframe rendering, image hosting, hashing, and the like. As a result, the system and its features may be used for protecting content on various third party platforms, such as Facebook and Instagram.

In operation, the system may be configured to receive content from a registered user via a user interface, such as a graphical user interface. The system may analyze the content to identify and/or define attributes corresponding to the content. Examples of attributes may include metadata and other information relating to features of the content. In addition, the system may be configured to process the content to, for example, generate a cryptographic hash for identifying instances of use of the uploaded content.

Further, the system may encode or add a watermark to the content according to one or more selected options or features, including the position of the watermark on the content, the size of the watermark relative to the content, and the color of the watermark. It is also contemplated that the watermark may be an interactive element that, when engaged, may redirect a user to, for example, an authentication page (or "landing page") of the system or the content creator detailing the authenticity of the content and/or providing additional information relating to the content.

In one aspect, the system may use the identified attributes and/or the generated cryptographic hash to evaluate the content. Evaluation of the content may include comparing the uploaded content and its corresponding data to third-party content stored within the system or on a network accessible to the system. In certain embodiments, if the system is unable to find the uploaded content, it may be stored in a database or repository. In addition, the system may associate and/or apply certain safeguards to the system for publication purposes. If the system determines that the uploaded content is published, the content will be flagged, and certain safeguards (such as applying for copyright protection) may not become available through use of the system.

In another aspect, the system may monitor the use of uploaded digital media content. This process may include monitoring for content as it is originally uploaded. In addition, the process may include monitoring for altered forms of content including minor or major alterations. The system may also be configured to provide a report to the registered user. The reporting may include certain information, such as where the media appears in its original or altered form.

Moreover, the system may facilitate taking certain actions in relation to the identified instances of use of content. In one example, the registered user may dismiss an instance of appropriate sharing or use of their content. In another example, the user may flag inappropriate use of the content. For purposes of this application, the term inappropriate may relate to unauthorized use, uncompensated or abuse of a user's content, including inappropriate manipulation of the content and synthetic media that uses some or all of the original content.

In certain preferred embodiments, the system may output educational materials to a user.

For example, the educational materials may inform users about their rights related to their content, and how to address misuse of that content, such as how to issue a take-down notice to the owner or host of a website.

In certain preferred embodiments, the system may provide one or more mitigation resources that may assist in redressing the misuses or unauthorized use of content. Mitigation resources may include customer service or legal assistance to have unauthorized or inappropriate use of content financially compensated for or ceased. For example, such services may include communicating (email, letter, phone, etc.) with offending platforms to have the unauthorized use removed, sending legal demands for compensation for unauthorized commercial use of the content, and pursuing a cause of action against recalcitrant perpetrators.

In certain preferred embodiments, the system may be configured to create a financial backstop, such as an insurance policy, that would compensate users that have been victimized by the unauthorized or inappropriate use of their content. This process may be created if mitigation does not completely solve a user's problems and they have suffered some financial loss due to the misuses or unauthorized use.

For example, a young woman may upload, via the present system, a watermarked image to Instagram. Another user might obtain the image from Instagram and apply artificial intelligence techniques that manipulates the image into a nude photograph, then circulate that altered image via a network, such as the Internet. That image may then come to the attention of the young woman's employer, who fires her for violating the firm's policies/moral standards. The woman may use the system disclosed to assist with getting her job back by verifying that her original photo had been abused. Further, if the mitigation efforts prove unsuccessful, and the woman doesn't get her job back, a backstop, created via the system, may be invoked to, for example, compensate her to some extent for her lost income.

While the invention is receptive to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

BRIEF DESCRIPTION OF THE DRAWINGS

The preferred embodiments of the invention will be described in conjunction with the appended drawings provided to illustrate and not to limit the present invention, where like designations denote like elements, and in which.

DETAILED DESCRIPTION OF THE INVENTION

The invention relates generally to a system and methods for protecting user content, and more particularly to a system and methods for monitoring and reporting use of content to prevent and redress misuses of the same or similar content. Also, the system may be configured to identify instances of proper use of the content to, for example, track information relating to the content and/or viewers of the content. Advantageously, the system may be configured to output a report to a user efficiently and effectively and further provide the user with one or more recommendations and/or options relating to the identified use.

Figure 1:
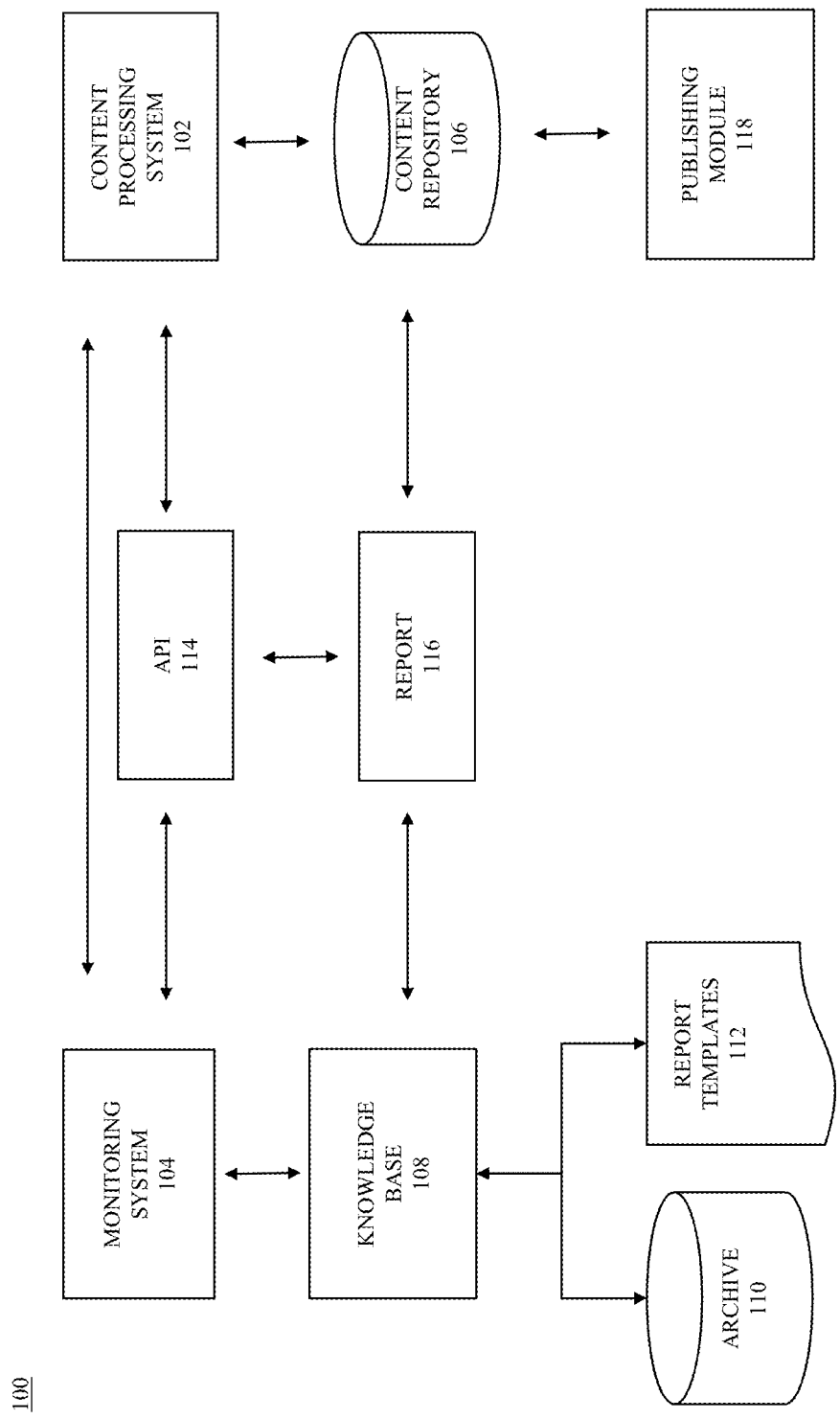
FIG. 1 illustrates an exemplary system that may be used to implement the methods according to the present invention.

Turning to the figures, FIG. 1 illustrates an exemplary system 100 that may be used for implementation of all or a portion of the processes detailed below. As shown, system 100 may include a content processing system 102 that interoperates with a monitoring system 104. While content processing system 102 and monitoring system 104 are shown as separate interoperating systems, it is contemplated that the review and monitoring functions may be subsystem components of a single integrated system.

Content processing system 102 may be configured to retrieve content from a repository 106 (for example, a DICOM archive) for display, review, analysis, and/or annotation. Content in repository 106 may be uploaded by a user, such as a registered user as detailed below. Examples of content in repository 106 may include audio, video, images, structured documents, and plain text. For purposes of this application, content uploaded to the system and stored in repository 106 may be referred to as uploaded or controlled content.

Content processing system 102 may be configured to analyze content to identify certain attributes corresponding to the content, such as metadata (or "meta data") and other information. Once identified, processing system 102 may facilitate generating a cryptographic hash, such as through use of a standard library and/or according to a unique hash function of system 100. The generated cryptographic hash of the controlled content may then be compared to cryptographic hashes corresponding to other content (internal and/or external to system 100). Comparison of cryptographic hashes may be used to, for example, evaluate the authenticity of the controlled content and/or to determine possible use (authorized or unauthorized) of the controlled content by others, as detailed below.

Content processing system 102 may further be configured to process controlled content stored in repository 106 to, for example, automatically identify or define certain features and/or modify the controlled content. In one example, processing system 102 may facilitate image processing such that features (e.g., boundaries, contours, shapes, or configurations of image content) may be automatically detected and distinguished. In another example, processing system 102 may be configured to modify or embed a digital and/or machine-readable watermark onto the content. In yet another example, processing system 102 may generate an audio fingerprint by extracting acoustic relevant characteristics of a piece of audio content.

In addition to the functions of processing system 102, other modifications to the controlled content are contemplated. For example, system 100 may be configured to rotate, resize, crop, warp, mirror, and/or apply a filter or background to the content. System 100 may be configured to store, such as in repository 106, any modifications or changes to the controlled content and associate those modified copies with the controlled content or a registered user.

Further, the architecture of system 100 may be configured to publish content stored in repository 106. In particular, a publishing module 118 of system 100 may define a framework for displaying and/or distributing content. For example, publishing module 118 may be configured to generate a Universal Resource Locators (URL) that may be used for publication of content on a social media platform or on other web-based or television-based platforms.

In addition, publishing module 118 may facilitate downloading the content and/or generating, for example, a link or iframe code for manual distribution of the content by a user. Through use of the link or iframe code, a user may engage (e.g., view, listen, interact, etc.) with the corresponding content. In certain embodiments, the display module may be configured to restrict certain operations, such as editing, printing, copying, and related functions corresponding to the content. Moreover, module 118 may be configured to output a message or notification related to certain protections associated with the content in response to detecting that the content is being viewed or in response to detecting an operation attempted by the viewer. Other attributes and information associated with the content may also be output through use of publishing module 118.

Monitoring system 104 may be configured to scan or crawl a network including website and individual web pages associated with the websites. During scanning or crawling, monitoring system 104 may be configured to identify third-party content and extract information associated with third-party content. Examples of extracted information may include multimedia content, social media links, font information, alignment information and hyperlinks, in addition to functional web site features such as forms, photo galleries, shopping carts, RSS feeds, Atom feeds, event calendars, checkout pages, and product listings. Further, monitoring system 104 may be configured to extract information associated with attributes of monitored content on the webpage. Examples of features may include the location, size, type, features, and any other metadata that may be available through the page directly or indirectly. Monitoring system 104 also may be configured to store a visual image of the web page to, for example, use for verification purposes.

In system 100 of FIG. 1, the interaction between the content processing system 102 and the monitoring system 104, and that which results from that interaction may be facilitated using an applications program interface ("API") 114. In particular, API 114 may facilitate the bi-directional association between the attributes of content from repository 106 and the information identified and/or extracted from web pages that corresponds to these attributes, which may be provided through a knowledge base 108.

Knowledge base 108 may be used to provide access to information identified and/or extracted from specific web pages stored in an archive 110. The system 100 may then compare the information identified and/or extracted from each web page against controlled content from repository 106 to detect instances of use of same or similar content. In one exemplary operation, knowledge base 108 may collect information from third-party content extracted by monitoring system 104 and, through processing system 102, use a hash function to calculate a cryptographic hash associated with the third-party content. System 100, such as through API 114, may then be configured to compare the third-party content's attributes and/or cryptographic hash with the metadata and/or cryptographic hash of the controlled content stored in repository 106. If the metadata and/or cryptographic hash closely matches that of the controlled content, system 100 may flag the instance for reporting to a corresponding registered user, as detailed below.

Knowledge base 108 may further provide access to report templates 112 to support the creation of a report 116. For example, knowledge base 108 may be configured to support the generation and display of data entry forms, diagrams, or other user interface elements, the generation of narrative text, tables, diagrams, or other material from recorded data, and the presentation of recorded data for review or revision through a screen display, graphical user interface, or in an infringement report.

Exemplary Flowcharts

Figure 2:
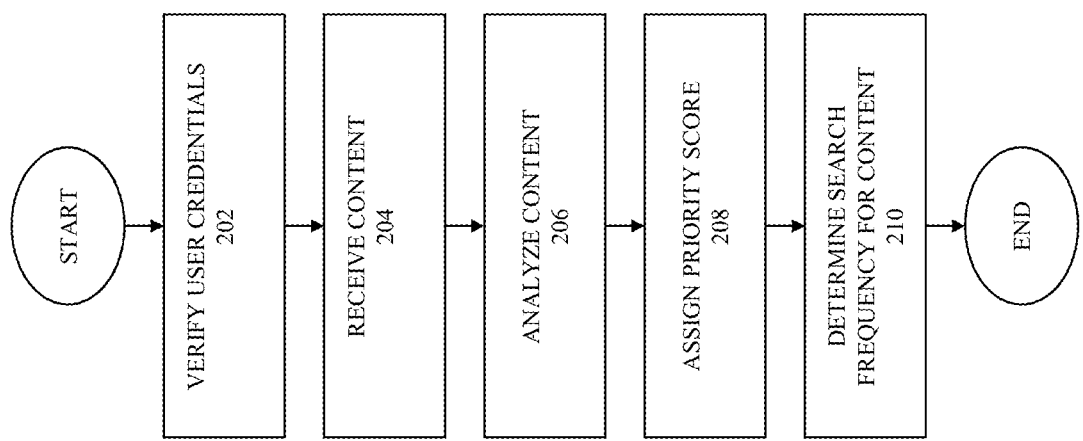
FIG. 2 is a flowchart illustrating an exemplary method for processing content to determine a monitoring frequency.

FIG. 2 illustrates a flowchart 200 for uploading and processing content to determine a monitoring frequency. The method of operation begins and, in step 202, the system may verify credentials of a user attempting to upload content. In one aspect, a user can register by linking their account with an existing account from a third party platform, such as Google, Facebook, or Twitter. Also, a user may create an account by inputting an identifier and a password. If no other uses of the same identifier are detected, then the system may store the entered user identifier and password for a newly registered user. Additional information may be collected from the user including, for example, age, contact information, occupation, and the like.

Furthermore, the system may associate one or more additional features with the registered user based on their status (paid or freemium, for example). It is contemplated that a freemium user may access one or more of the features available to paid users by, for example, completing task or activities, such as referring a friend, applying a watermark to their content, linking one or more social media accounts, and the like. Additional features may relate to the amount of content monitored, the actions available in response to an instance of use of the same or similar content, the ability to protect and share the content, and the like.

Many features may be available to both freemium and paid users, but a number of features may be available only to paid users. The system may allow freemium users to earn "credits" by performing certain tasks. For example, freemium users may upload, protect, and monitor N number of images for free and may purchase or obtain credits to upload and monitor P number of additional images. Also, freemium users may earn the ability to protect and monitor an additional R number of images for each of their social media accounts they link to their registration. It is further contemplated that the distribution to third-party platforms or social media platforms of content that features a promotional element (such as a watermark) may not count against a user's upload allotment and/or credits.

Figure 3:
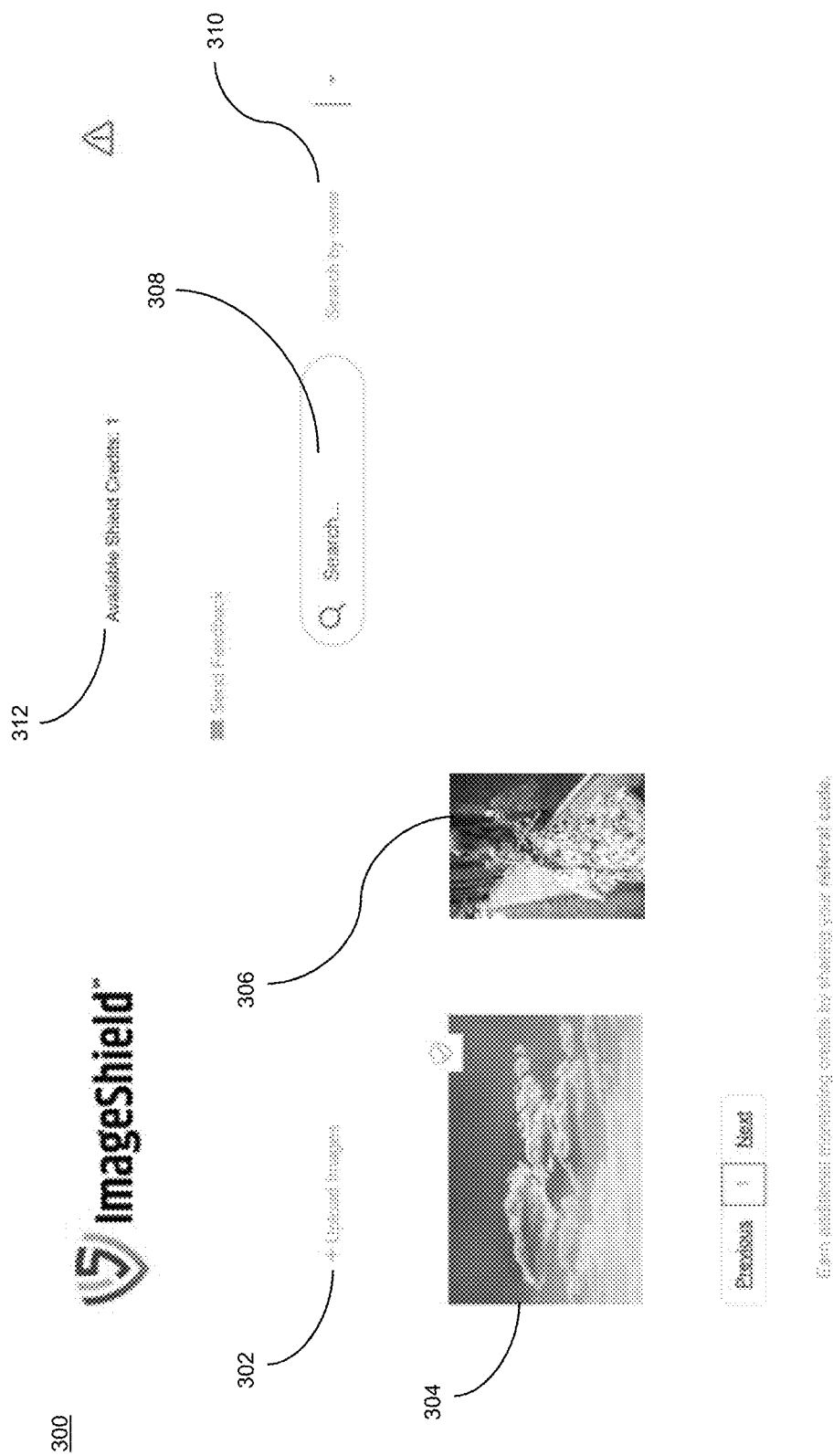
FIG. 3 illustrates an exemplary user interface through use of which a registered user may upload content.

In step 204 of FIG. 2, the system may receive content from, for example, a registered user's device and/or from a third party platform. FIG. 3 illustrates an exemplary user interface 300 including an upload function 302 through use of which a registered user may upload content, such as images, 304, 306. It is contemplated that a registered user may upload multiple content items at once or that the user may upload individual items of content. Once uploaded, the system may display all content associated with the registered user—such as in the illustrated gallery view of user interface 300—and provide the user with, for example, a search function 308, a sort function 310, and other functions, such as a select function for selecting content to be monitored. Moreover, as shown in FIG. 3, credits 312 associated with the registered user may also be displayed on user interface 300. As discussed above, through use of credits 312, registered users may, for example, increase the number of content items monitored, take actions available in response to a detected instance of use of the same or similar content, protect and share the content, and the like.

Figure 4:
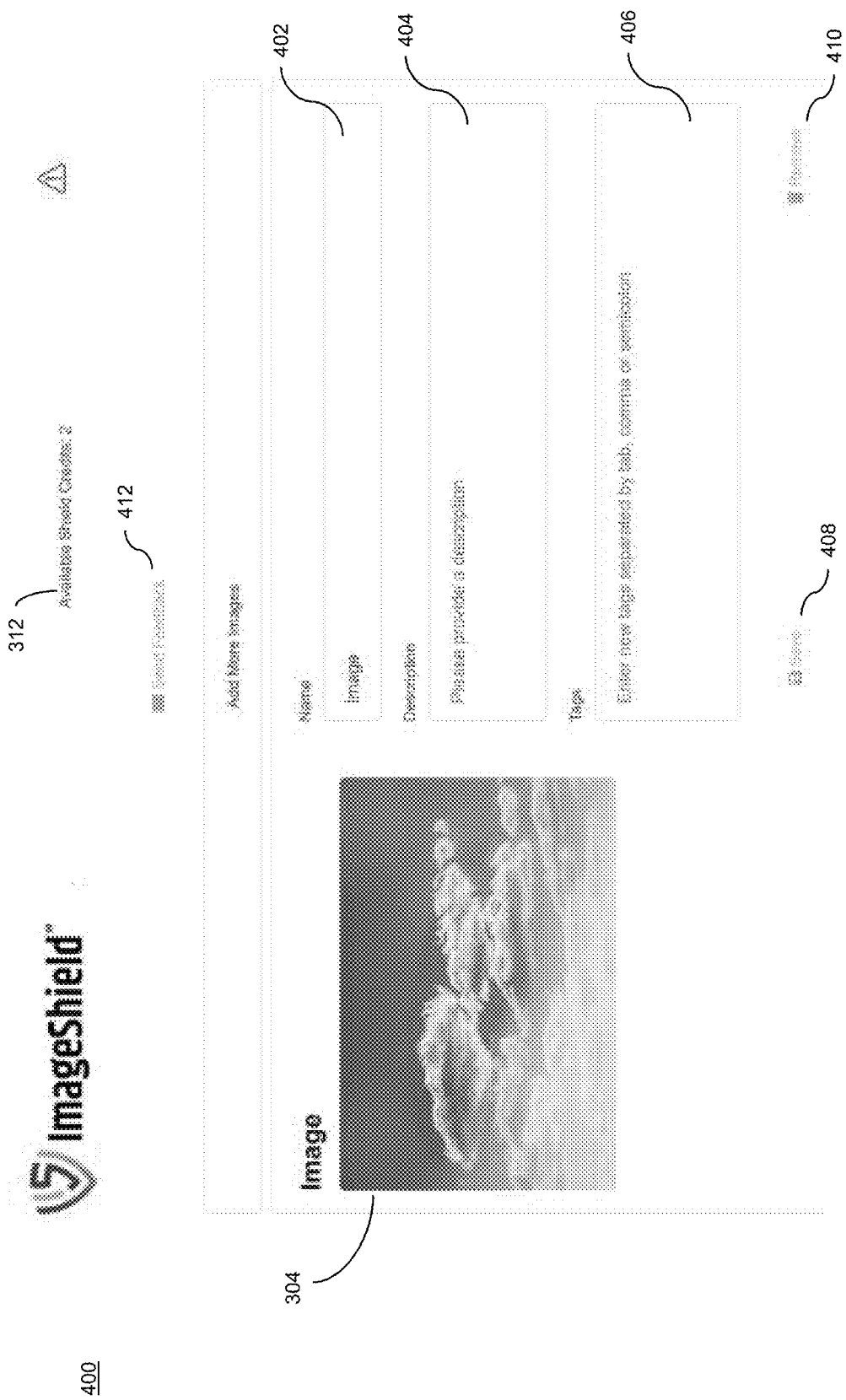
FIG. 4 illustrates an exemplary user interface for inputting additional information corresponding to uploaded content.

FIG. 4 illustrates another exemplary user interface 400 by which the system is configured to receive additional information corresponding to uploaded or controlled content. As shown, a user, through user interface 400, may be presented with one or more input fields 402, 404, 406 associated with image 304. While interface 400 is illustrated to include input fields that correspond to a "Name", "Description", and "Tags," other input fields are contemplated, which may be filled in by, for example, selecting items from an on-screen menu or typing in text. In addition, user interface 400 may provide a save function 408, remove function 410, and send feedback function 412.

Figure 5:
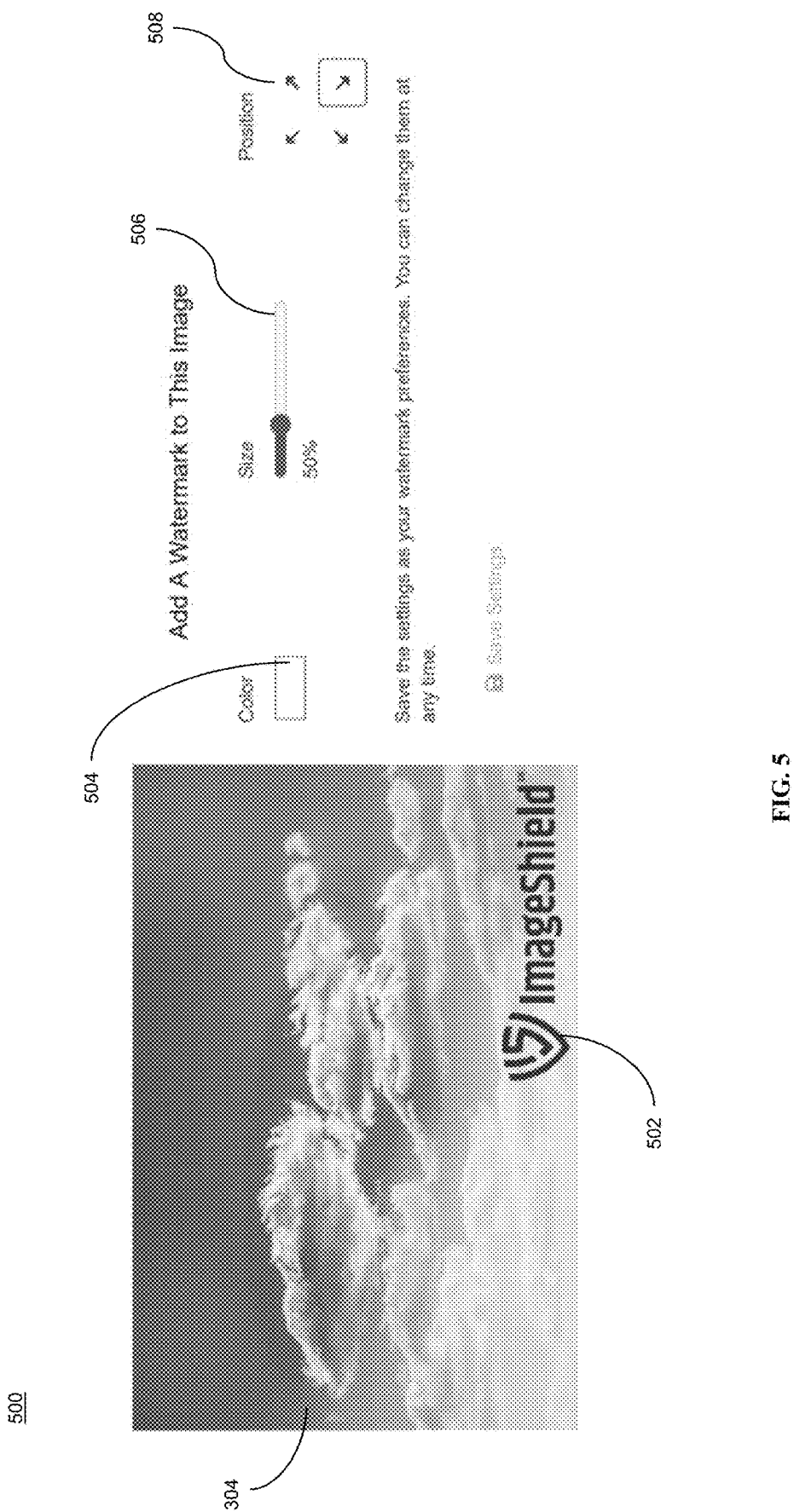
FIG. 5 illustrates an exemplary user interface for encoding or adding a watermark to uploaded content.

FIG. 5 illustrates yet another exemplary user interface 500 by which the system is configured to, automatically or in response to a user input, encode or add a watermark 502 to content. Watermark 502 can be a digital signature, a user identifier, a logo, or similar value that may sufficiently identify the content as to its origin or ownership, and signal to potential abusers that use of the content is being monitored. In addition, watermark 502 may be an interactive element. For example, when watermark 502 is engaged by a user, the system may be configured to redirect a user to an authentication page (or "landing page") of the system or the content creator detailing the authenticity of the content and/or providing additional information relating to the content.

As shown in FIG. 5, a user, through user interface 500, may add watermark 502 to image 304. User interface 500 also may provide controls for manipulating various features corresponding to watermark 502 and image 304. For example, the user select the color control 504 to change the color scheme of watermark 502. In another example, the user may alter the size of watermark 502 through use of a scroll bar 506, which may include a bar and a slider such that the position of the slide on the bar corresponds to the size of watermark 502 relative to image 304. In yet another example, through use of a position control 508, the user may choose the display location of watermark 502, such as one of the four corners of image 304. Other controls relating to watermark 502 are contemplated, such as controls relating to transparency, font, contrast, brightness, and the like.

Returning to flowchart 200 of FIG. 2, in step 206, the system may analyze the uploaded or controlled content to, for example, determine the susceptibility of the content. The system may be configured to analyze the content using known techniques and/or unique algorithms that facilitate voice recognition and image recognition. For example, the system may analyze a video (e.g., video data, audio data, etc.) for various patterns that match known patterns associated with certain types of content (such as swearing, nudity, sex, violence, etc.) and may generate tags and/or labels automatically and store them in association with the content. For instance, the system may be configured to use a set of machine leaning algorithms to label, for example, a subject identified in the content, such as a person, animal, object, location, and the like.

In addition, the system may specify multiple metadata fields that can be used for comparing content with other third-party content accessible to the system to, for example, determine whether there is a match, which may indicate that third-party content is the same or similar to the controlled content. It is also contemplated that the system may be configured to use multiple APIs to receive inputs about the content, such as inputs relating to the amount of bared human skin in image or video content, the use of profanity in audio content, and a percentage of plagiarized text.

In step 208 of FIG. 2, the system may be configured to assign a priority score to the content. The priority score may be based on one or more parameters including, but not limited to, the registered user, the susceptibility of the content, combinations of both, and the like. For instance, the system may be configured to apply classification techniques based on the user's information, previously uploaded content, policy violations, or combinations of each.

In addition, the system may be configured to classify the relative sensitivity of the content, such as based on the generated tags associated with the content. For example, the system may assign a high priority score to content including a large amount of bared skin. This may include processing (such as through use of a Gabor filtering or Fourier Transform based techniques) the content to determine whether a percentage of the content corresponding to skin texture is above a predetermined threshold level. Other examples of content that the system may assign a high priority score include artwork, musical works, landscape photography, and wildlife. If the registered user uploads an image of a pet dog, for example, the system might assign a low priority score to that content, while an uploaded image of a young girl might be assigned a high priority score.

In step 210, the system may be configured to determine a frequency for monitoring for use of the content. The monitoring frequency may be based on the priority score assigned to the content and/or other parameters associated with the content or registered user. For instance, content with a high priority score will be associated with a high frequency for monitoring for use of that content. In certain embodiments, a user, such as a paid user, may be permitted to manually input or select the frequency with which they wish to monitor for use of their content. Examples of a frequency for monitoring may include daily, weekly, monthly, and yearly.

Figure 6:
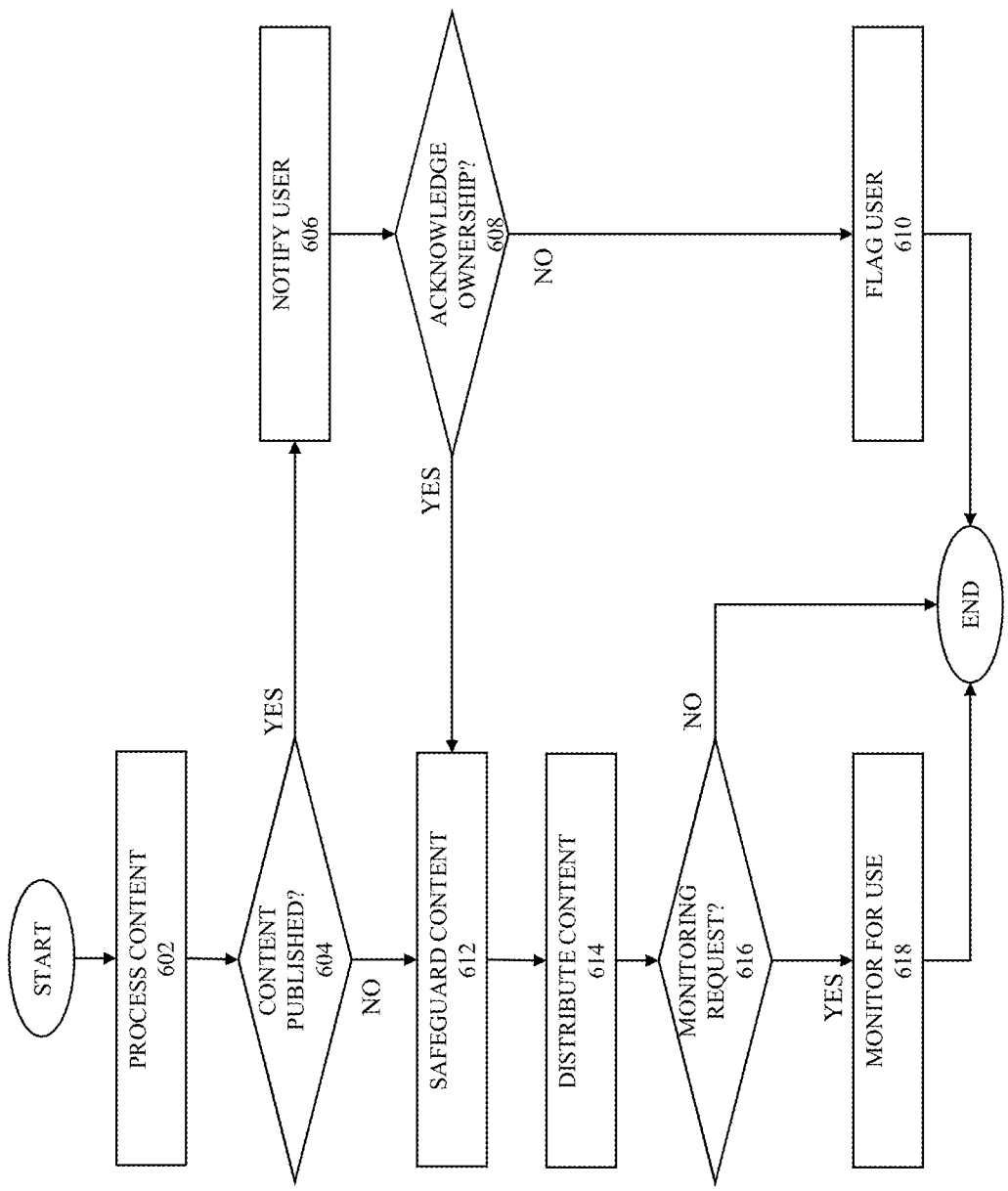
FIG. 6 is a flowchart illustrating an exemplary method for initiating a monitoring process.

FIG. 6 illustrates a flowchart 600 for initiating a monitoring process. The method of operation begins and, in step 602, the system may be configured to process content, such as content received from a registered user and stored in a repository accessible to the system. The processing step performed by the system may include an analysis (which may be similar or in addition to analysis step 206 of FIG. 2) of the content to identify and define certain attributes (metadata, features, and other information) associated with the content. Example attributes that the system may analyze include pixel count, resolution, file size, frame count, audio frequency mapping, file type, and the like. In addition, as discussed above, the system may use a hash function to calculate a cryptographic hash corresponding to the content.

In decision step 604, the system may be configured to determine whether the controlled content is published. The system may compare one or more attributes of the controlled content with attributes corresponding to third-party content, such as third-party content controlled by the system, third-party content published on a social media platform or on other web-based or television-based platforms, and other third-party content accessible to the system. For example, the system may be configured to determine whether the controlled content is published by comparing the controlled content's metadata and/or cryptographic hash with metadata and/or cryptographic hashes of other content accessible to the system. For purposes of this application, published content refers to controlled content that a user voluntarily or involuntarily disseminated to the public.

If at decision step 604, the system determines that the content is published, in step 606, the system may send that user a notification. The notification may, for example, include an inquiry or message. The system may further require that the registered user acknowledge (or consent to certain terms and conditions) that they have ownership rights to the respective content. In decision step 608, the system will determine whether the registered user has acknowledged ownership of the content. If at decision step 608, the system determines that the registered user has not acknowledged ownership of the content, in step 610, the system will flag the instance and/or the registered user.

If at decision step 604, the system determines that the content is not yet published, or at decision step 608, the user acknowledges ownership of the content, then, in step 612, the system may be configured to apply safeguards or protectable measures to the content. One example of safeguards that the system may apply includes encrypting the content received from a registered user. In particular, using various encryption techniques, the system may encrypt the content such that it would be viewable only once decrypted by a delivered encryption key. Even if the content were to be extracted from the system directly, the end product would be unusable.

Other safeguards or protectable measures that the system may be configured to apply to content may include technical protections, functional protections, and/or legal protections. For instance, the system may apply techniques to disable, for example, the downloading, printing, and screenshotting of content. In addition, protectable measures may include preparing and filing electronic documents for legal protections. For example, the system may be configured to generate and/or file electronic documents (including pages or forms), such as a trademark application form which after being prepared can be electronically filed (or downloaded, printed and manually filed) with the U.S. Patent and Trademark Office, and a copyright registration form which after being prepared can be electronically filed (or downloaded, printed and manually filed) with the U.S. Copyright Office. It is also contemplated that the system may be configured to assist with registering collections of content with the U.S. Copyright Office. In certain embodiments, applicable safeguards that the system is configured to apply may be based on whether the content has been published. For instance, the system may be configured to batch unpublished content for preparing and/or filing as collection for copyright protection.

Figure 7:
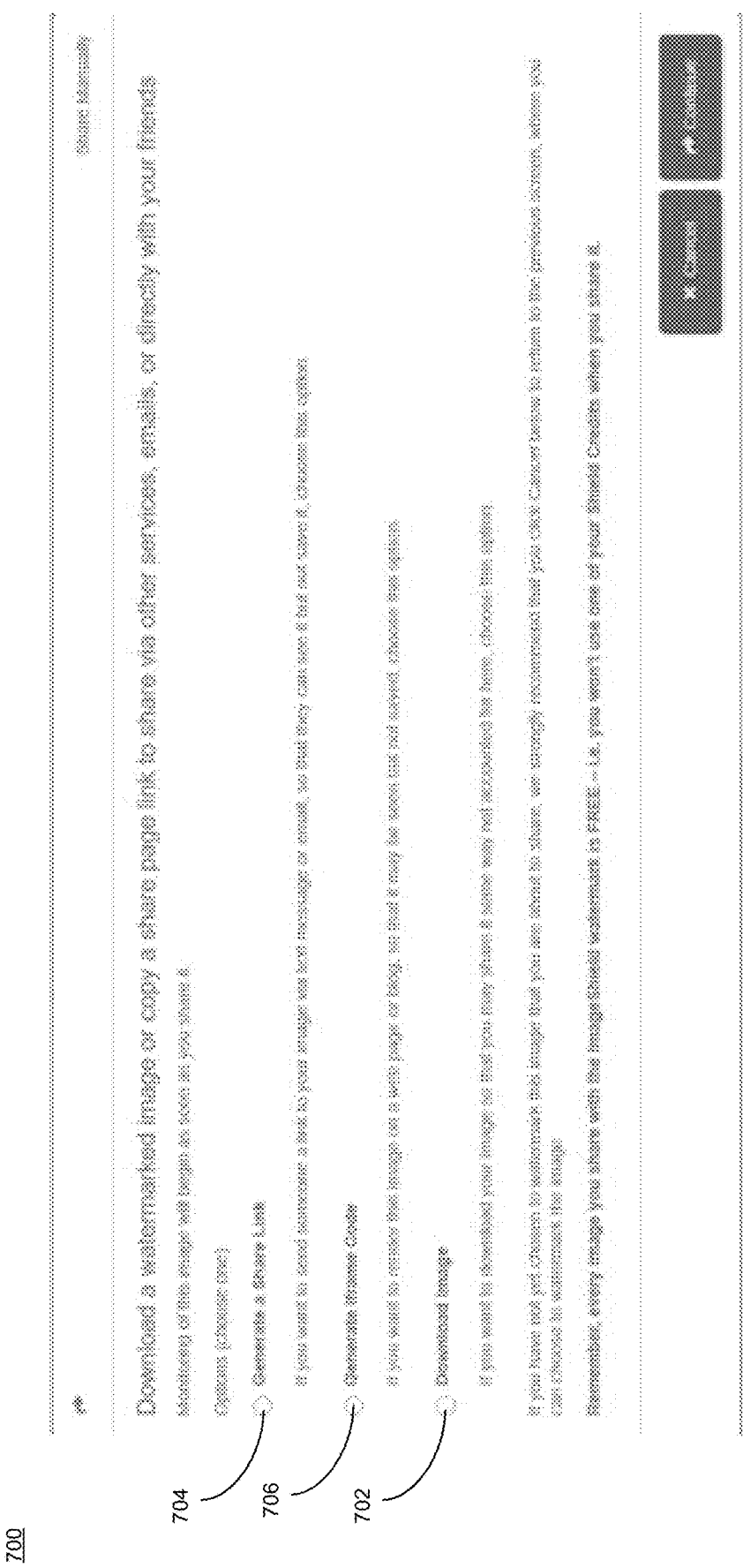
FIG. 7 illustrates an exemplary user interface through use of which a user may select a manual sharing option.

In step 614 of FIG. 6, the system may be configured to distribute the content. As discussed above, the system may generate a Universal Resource Locators (URL) that may be used for distribution of content via a social media platform or on other web-based or television-based platforms. In addition, as shown in FIG. 7, the system may output a user interface 700, through use of which, a registered user may select a manual sharing option. For example, based on the user's selection, the system may facilitate downloading the content 702 and/or generating, for example, a link 704 or iframe code 406 for manual distribution of the content by a user. Through use of the link or iframe code, a user may engage (e.g., view, listen, interact, etc.) with the corresponding content.

More specifically, a component of the system, such as publishing module 118 (FIG. 1), may facilitate the distribution of content. For example, the system may provide access to the content via an application or an iframe. An iframe may refer to an HTML element that allows one HTML document to be embedded inside another HTML document. In one instance, based on the safeguards applied at step 612, the iframe code may include a set of web scripts to restrict and/or disable certain operations, such as editing, printing, copying, and related functions corresponding to the content. Moreover, the system may be configured to output a message or notification corresponding to protectable measures applied to the content. For example, in response to detecting that the content is being output, the system may display an informational element corresponding to the copyright protections associated with the content. In another example, in response to a detected operation associated with the content, the system may output an alert, apply a filter to the content (rending it unviewable), or remove the content from display. Other attributes and information associated with the content for output are also contemplated.

In decision step 616, the system will determine if the content should be monitored. If yes, in step 618, the system will initiate a monitoring process for identifying and/or recorded instances of use of the content, as detailed below.

Figure 8A:
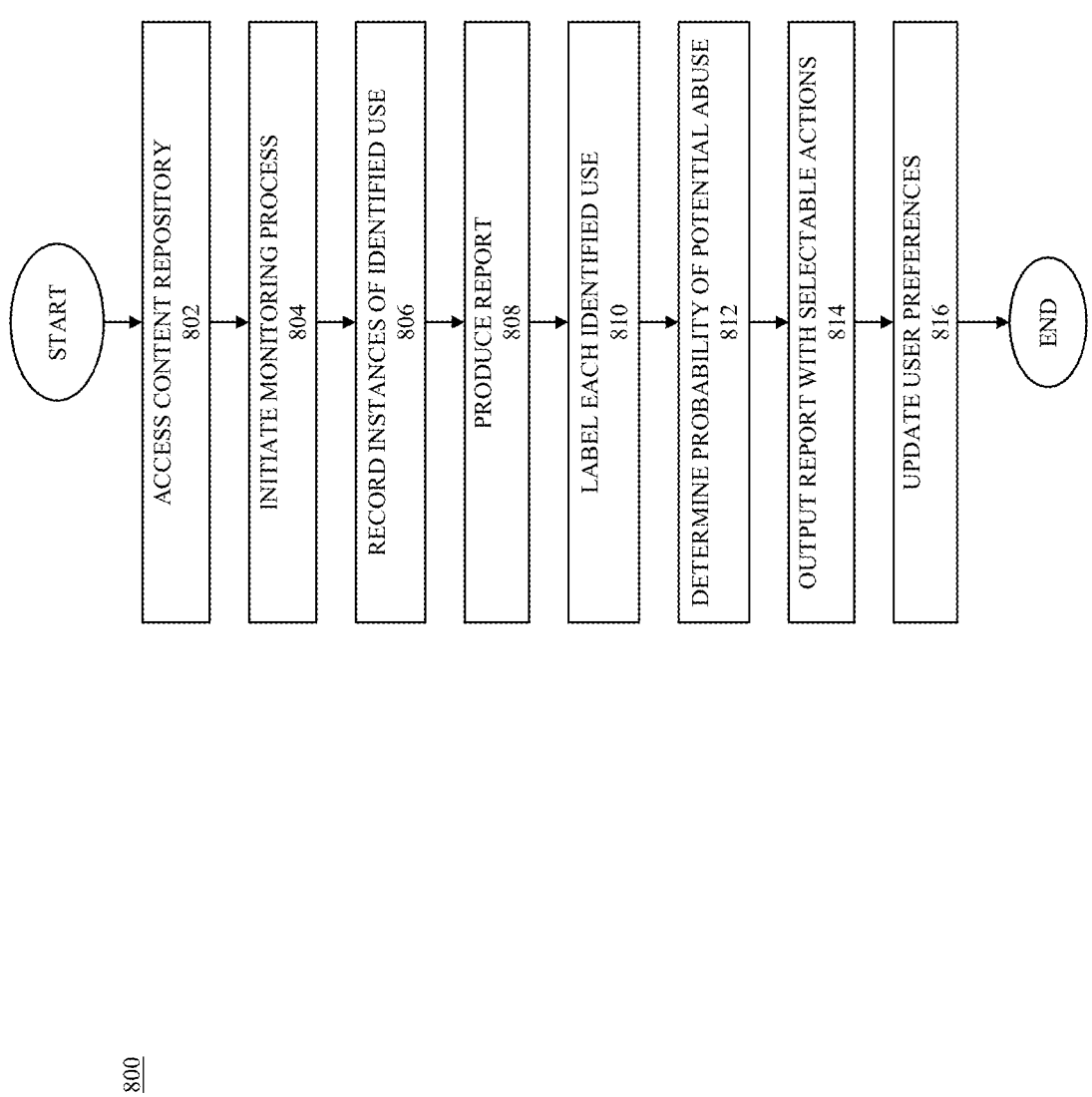
FIG. 8A is a flowchart illustrating an exemplary method for outputting a report including one or more identified instances of use.

FIG. 8A illustrates a flowchart 800 for outputting a report to a registered user. The method of operation begins and, in step 802, the system may be configured to access a database, such as content repository 106 of FIG. 1. In step 804, the system may initiate a monitoring process to monitor for the use of the same or similar content. As discussed above, the monitoring process may be based on a frequency associated with the content.

In one aspect, a crawler may perform the monitoring of a network accessible to the system. The crawling may be a web crawling that browses web pages over a network, such as the intranet or internet, in a methodical and orderly way. As the crawler visits these URLs, the crawler can identify content on the webpage that is the same or similar to the original content being monitored. In another aspect, a scraper may perform the monitoring. Web scraping can be performed to extract information from webpages. This extracting may be performed by scrapers that simulate manual exploration of a network. The simulation can be performed by implementing either hypertext transfer protocol (HTTP) or by embedding browsers.

In step 806, the system may be configured to record instances of use of the same or similar content monitored. For example, the system may identify an instance of use of the same or similar content during the monitoring of a network. In another example, the system may compare metadata extracted from a URL with metadata of the controlled content to determine whether there is a match indicating use of the same or similar content.

Further, the system may be configured to calculate a score representing how confident it is that the content identified is the same or similar to the registered user's content. In addition, the system may filter instances of use based on a confidence score. For example, the system may filter detected instances of use of the same or similar content based on predetermined thresholds of confidence ratings. For instance, the system, using the predetermined thresholds, may determine that instances of use with high confidence scores may be recorded for reporting to a user, while instances of use with a low confidence score may be disregarded.

In step 808, the system may be configured to notify the registered user and produce a report of each recorded instance of use of the same or similar content. The report may be in the form of tables, graphs or charts. Furthermore, the report may be organized based on, for example, a user's preferences or a popularity of the webpages recorded.

In step 810, the system may be configured to tag and/or label each recorded instance using, for example, public domain information or user feedback. In addition, the system may store the information used for labeling each recorded instance and associate that information with content. In step 812, the system may determine the probability of a threat or a potential abuse of the content. More specifically, the system may analyze tags or labels associated with the content, such as those generated by the system in step 206 of FIG. 2, and the tag or label of each recorded instance to determine the probability of abuse.

Figure 8B:
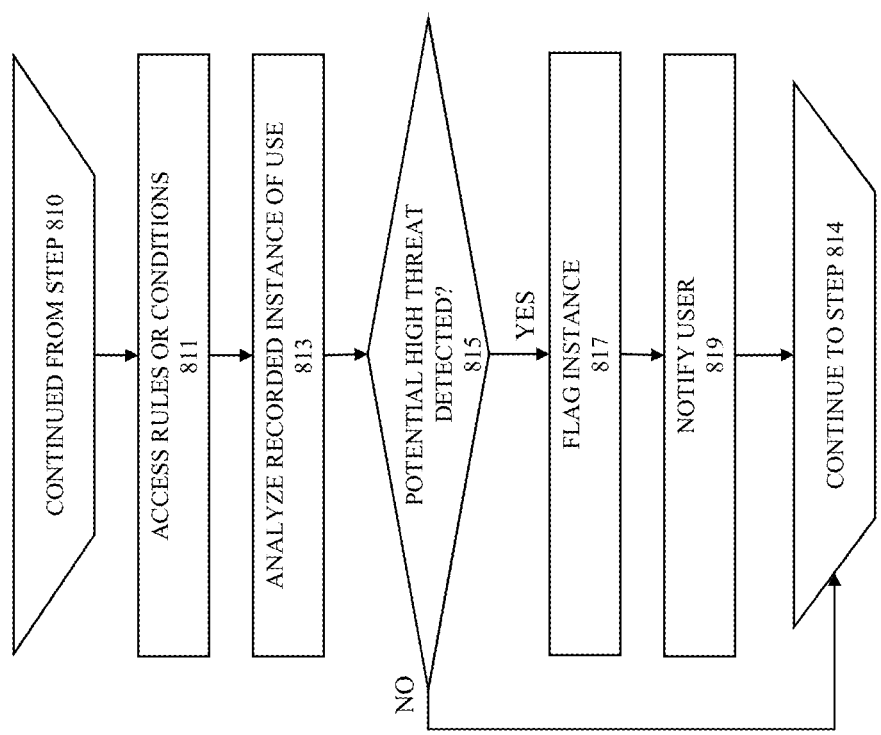
FIG. 8B is a flowchart illustrating an exemplary method for determining a probability of potential abuse of one or more identified instances of use.

FIG. 8B is a flowchart 801 providing more detail of step 812 of FIG. 8A. The operation is continued from step 810 of FIG. 8A and, in step 811, the system may be configured to access a set of rules or conditions. It is contemplated that the rules or conditions of the system may be predefined or may be dynamically created and/or modified based on, for example, user feedback, user-selected actions, user preferences, and the like. In step 813, the system may analyze each recorded instance of use. In particular, the system may apply the set of rules or conditions during analysis of the tags or labels associated with the content and a corresponding recorded instance of use.

In step 815 of FIG. 8B, the system may determine whether a high threat is detected. For example, if the tags or labels associated with content correspond to a person and the tags or labels associated with a recorded instance correspond to a pornographic website, the system may determine that there is a high probability of abuse. As another example, if the tags or labels associated with content correspond to an animal and the tags or labels associated with a recorded instance correspond to a dating website, the system may determine that there is a low probability of abuse. As yet another example, if the tags or labels associated with content correspond to a product and the tags or labels associated with a recorded instance correspond to an ecommerce website, the system may determine that there is a high probability of abuse.

If at step 815 of FIG. 8B a potential high threat is detected, in step 817, the system may flag the instance. In step 819, the system may notify the user and continue to step 814 of FIG. 8A.

Returning to flowchart 800 of FIG. 8A, in step 814, the system may output the report to a registered user via a mobile or browser application. It is also contemplated that the system may transmit reports via electronic mail or some other medium for review based on, for example, a user's preferences. Reports may be output to a user periodically, such as weekly, bi-weekly, or monthly. Alternatively, the system may output a report in response to each identified use of the content, for instance, if a potential high threat is detected. In step 816, the system be configured to update corresponding user preferences based on, for example, detecting a selected action, which may then be used in the analysis of each recorded instance output in the report to determine the probability of a threat or a potential abuse of the content.

The report may include data entry controls such as pick lists, checkboxes, numeric boxes, text boxes, and buttons corresponding to an option or action that the registered user may take in relation to an identified instance of use of the same or similar content, as detailed below. For example, the report may include buttons corresponding to one or more of the following options or actions: "Ignore instance, "Ignore Domain," "Report Improper Use," "Add to a Category," "Request Take-Down," "File Copyright," "Take Legal Action." Other contemplated options and actions may include flagging a domain or URL, increase in monitoring frequency, review of educational resources to address unauthorized or illegitimate use of the content, and obtaining mitigation services to address the misuses.

Figure 9:
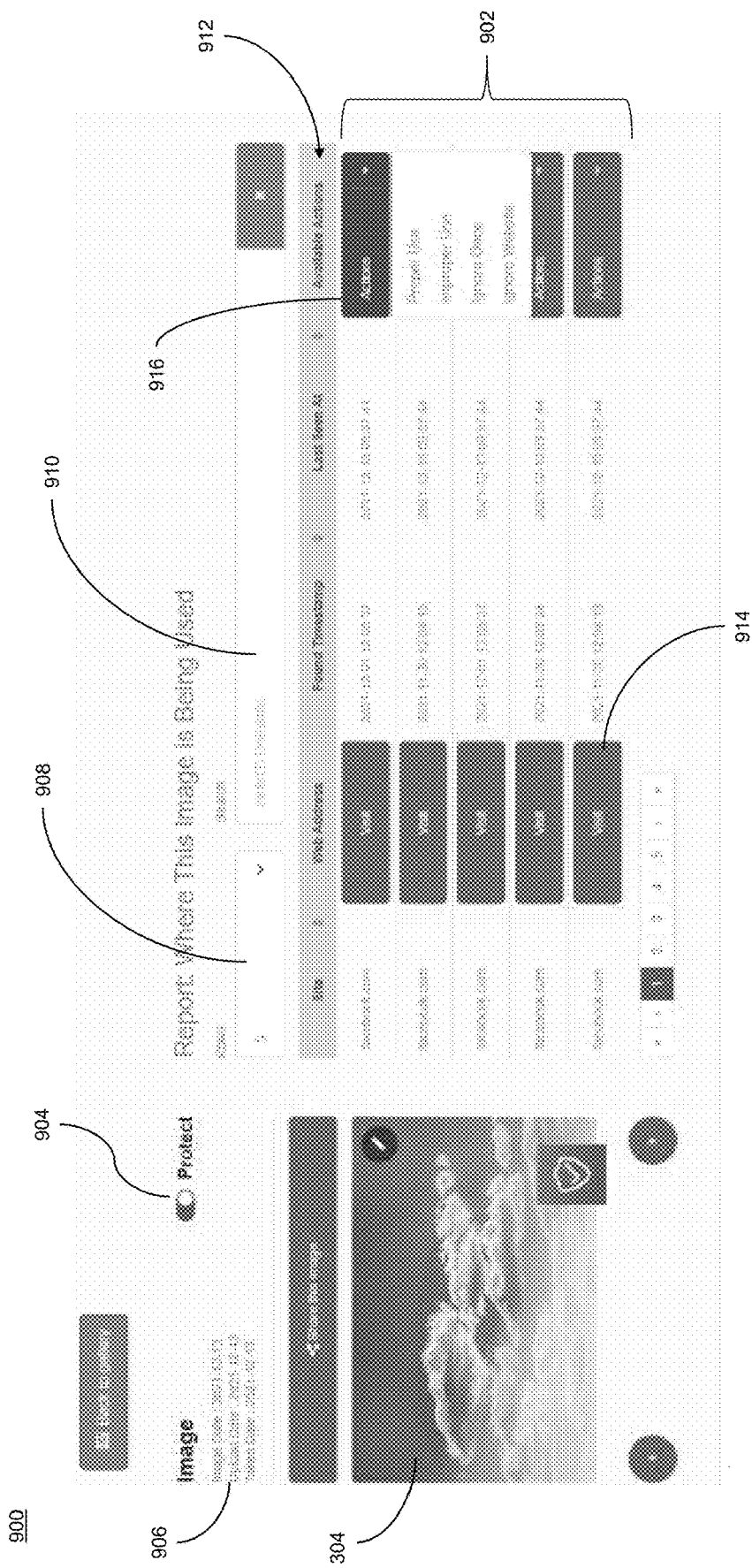
FIG. 9 illustrates an exemplary report including one or more instances of identified uses of content and corresponding selectable actions.

FIG. 9 illustrates an exemplary report 900 including one or more identified instances 902 of use of a registered user's content. As shown, exemplary report 900 may output the content, i.e., image 304, and permit the user to select, via toggle 904, whether to continue protecting and/or monitoring services associated with the content. Further, report 900 may include date data 906 corresponding to image 304, such as the illustrated "Image Date," "Upload Date," and "Taken Date."

As shown, exemplary report 900 may include drop-down menu 908 and input field 910 to permit the user to search and/or organize the various information output in exemplary report 900. Furthermore, report 900 may be configured to permit the user to sort and/or filter the one or more instances 902 based on certain criteria 912, such as "Site", "Found Timestamp", and "Last Seen At."

As shown, report 900 may further include buttons 914 corresponding to each recorded instance 902. When clicked by the user, buttons 914 facilitate redirecting the user to, for example, the website on which use of the same or similar content was detected. In addition, report 900 may include dropdown controls 916 corresponding to each recorded instance 902. Dropdown controls 916 may permit a user to select one or more actions or options corresponding to the related instance, such as Proper Use," "Improper Use," "Ignore once," and "Ignore Website."

Figure 10:
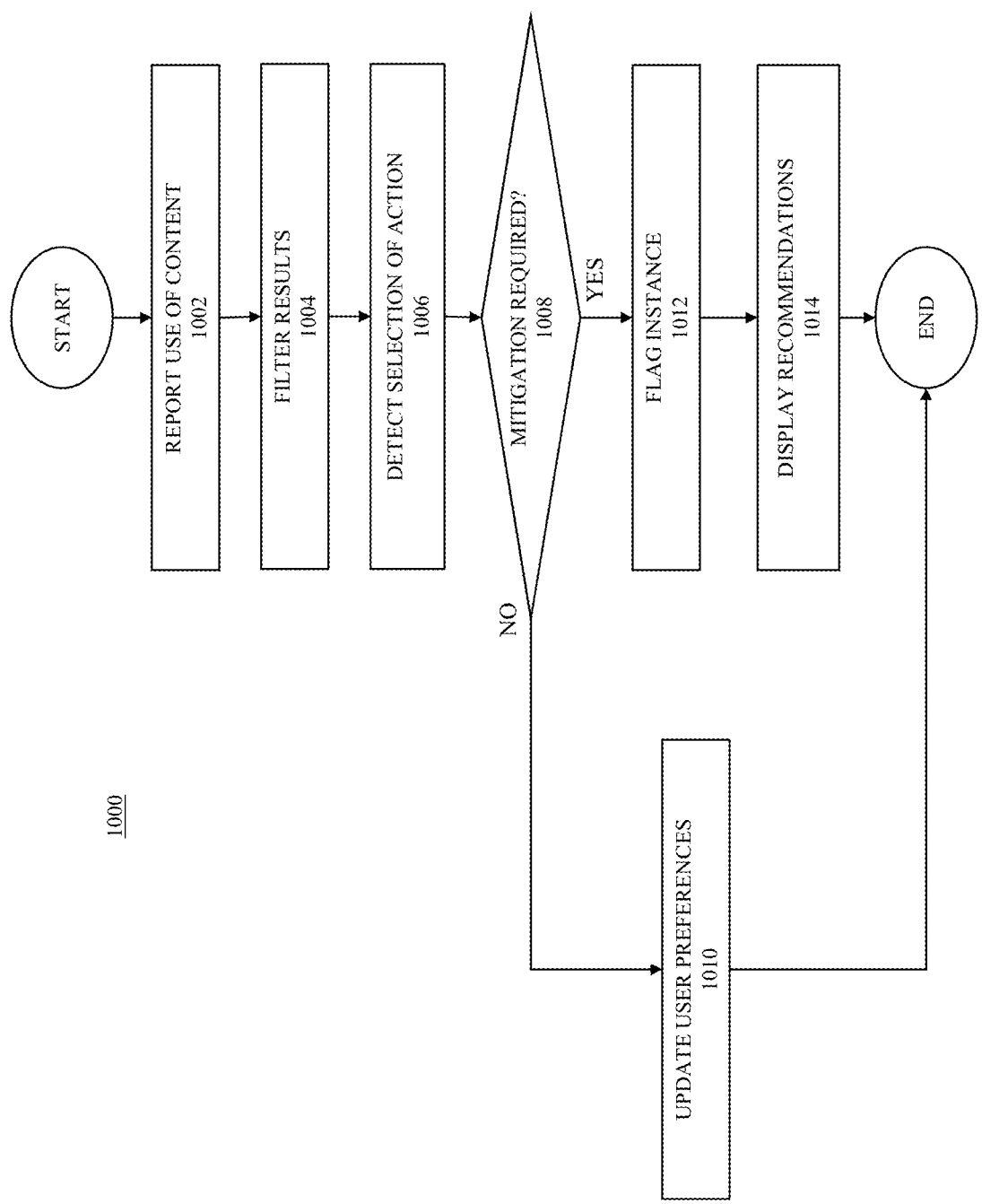
FIG. 10 is a flowchart illustrating an exemplary method for displaying, in response to a user's selection, one or more recommendations corresponding to the identified instance of use.
Figure 11:
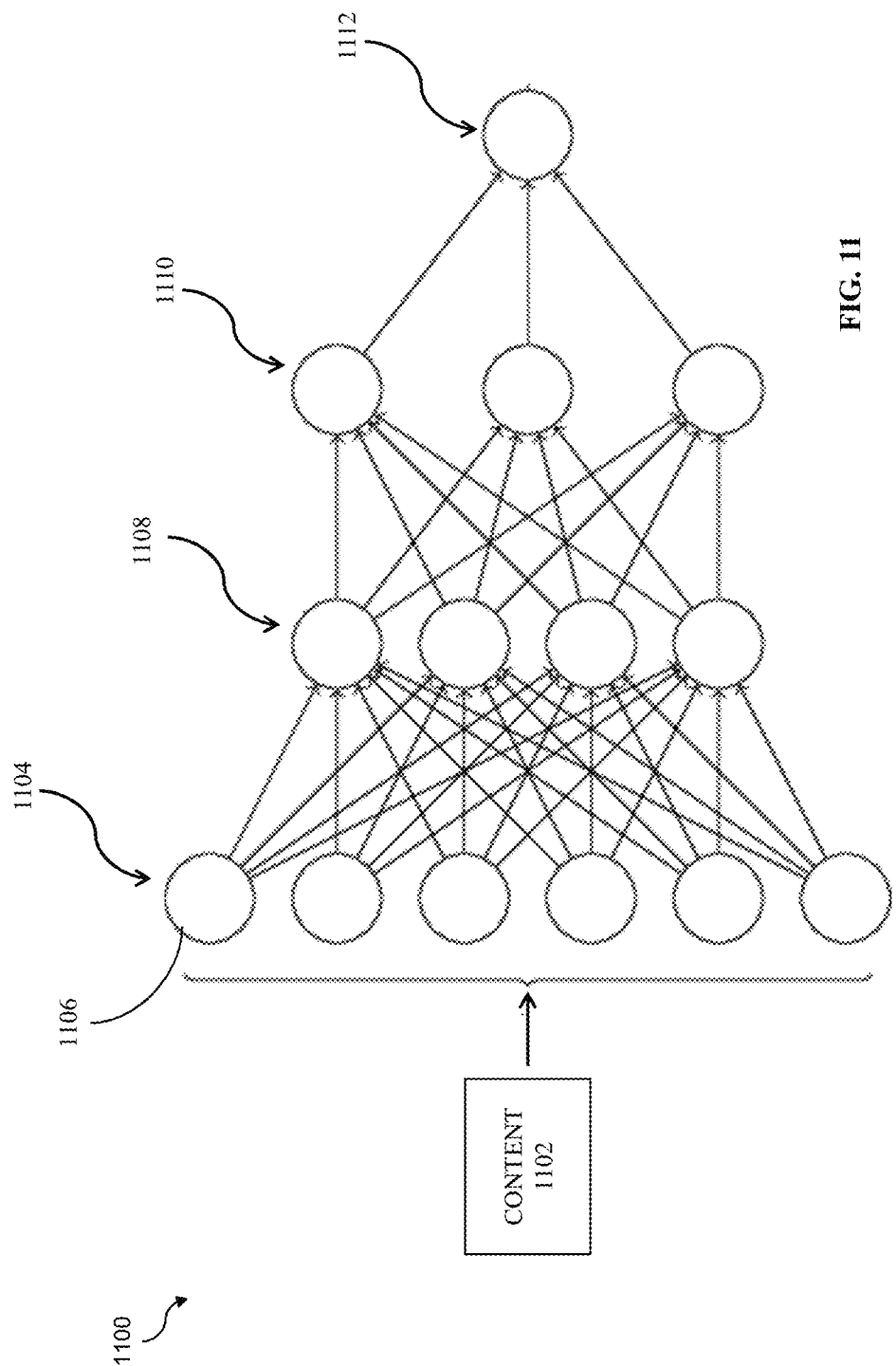
FIG. 11 illustrates an exemplary neural network that may be used to authenticate content.

FIG. 10 illustrates a flowchart 1000 for displaying one or more recommendations and/or actions corresponding to a recorded instance of use of the same or similar content in a report. The method of operation begins and, in step 1002, the system may distribute a report of identified uses of the same or similar content to a registered user. In step 1004, the system may filter the resulting recorded instances of use based at least in part on the preferences of the registered user. For example, recorded use of content may be filtered based on previous actions taken by the registered user, categories of content, websites identified, a priority and/or a confidence score associated with the content, combinations of each, and the like.

In step 1006, the system may detect a user selection of an action corresponding to the recorded instance of use. In decision step 1008, the system may determine, based on the user's selection, whether mitigation is required. Examples of mitigation may include sending a notice and take-down request to an entity associated with a URL (host provider) and redressing the misuse of content, such as pursuing an insurance backstop to reimburse the user for any loss and/or damage.

If, based on the user's selection, no mitigation is required, in step 1010, the system may update the registered user's preference. If at decision step 1008, the system determines that mitigation is required, in step 1012, the system may flag the instance for further review. The review may be automatically performed by the system, stored for access by a third party system, or distributed to another user of the system, such as a legal professional.

In step 1014, the system may display one or more recommendations and/or options corresponding to the identified instance of the same or similar content. For example, the system may direct a user to educational materials that may assist in removing the user's content from a URL.

Exemplary Neural Network

FIG. 7 illustrates an exemplary neural network 1100 that may be used to implement all or a portion of the methods according to the present invention. For example, the neural network 1100 can be used to determine the susceptibility of content, such as the amount of nudity in an image, and assign a priority score. In another example, the neural network 1100 may be configured to classify content and/or assign a confidence score to monitored content.

As shown, network 1100 may first segment content 1102 into portions of data (such as pixel data). The segmented data may then be input into a first layer 1104—an input layer. Each layer in the neural network 1100 is made up of neurons 1106 that may include learnable weights and biases. The middle layers—for example, 1108 and 1110—are termed "hidden layers." Each hidden layer is fully connected to all neurons in the first input layer 1104. The neurons in each single layer of the hidden layers 1108, 1110 function completely independently and do not share any connections. The last fully-connected layer 1112 is termed the "output layer" and may represent an identified data element, such as a structured data element. In certain embodiments, the neural network 1100 may be positioned between any two layers of a convolutional neural network such that the output layer 1112 acts as an input into another layer of a neural network.

In this embodiment, the hidden layers 1108, 1110 neurons include a set of learnable filters, which can process portions of received content 1102. As the content is processed across each filter, dot products are computed between the entries of the filter and the content 702 to produce an activation map that gives the responses of that filter to the content 1102. The neural network 1100 will learn filters that activate when they detect sensitive features in the content.

In certain embodiments, the machine learning model may be trained to identify minor changes to content features and/or characteristics without changing the essence of the content itself. One example of this would be a compressed version of an image with no changes made to the actual image content. After the algorithm is fed with the training set, it will recognize patterns that are then used to identify instances of use of the same or similar content based on content that has been converted but not manipulated.

Exemplary Computer System

Figure 12:
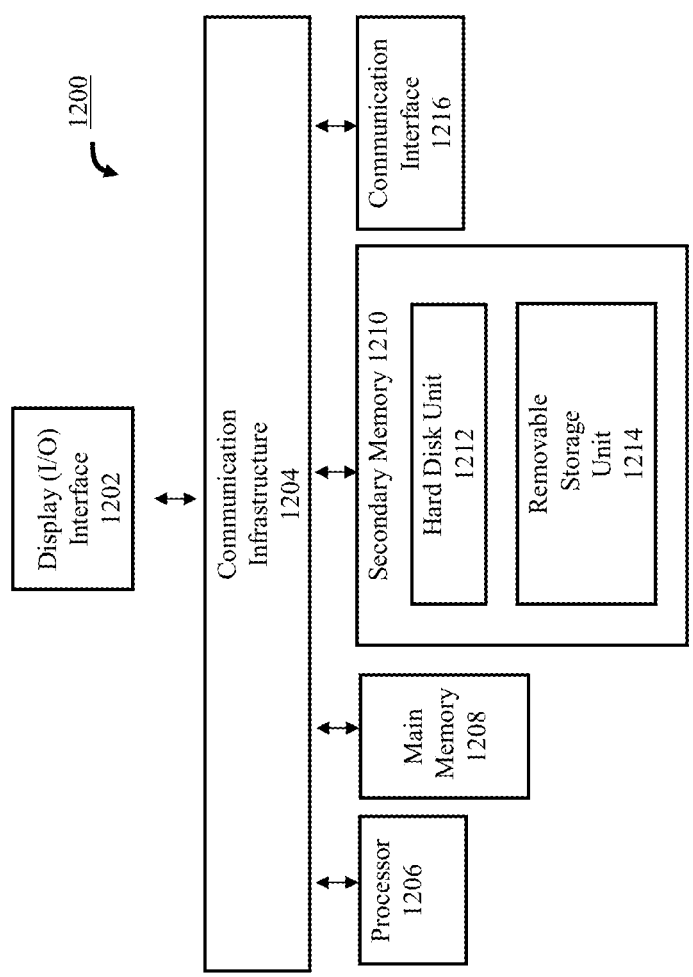
FIG. 12 is an exemplary computing system that may be used for implementation of all or a portion of the invention.

FIG. 12 illustrates a diagram of a system of which may be an embodiment of the present invention. Computer system 1200 includes an input/output interface 1202 connected to communication infrastructure 1204—such as a bus—which forwards data such as graphics, text, and information, from the communication infrastructure 1204 or from a frame buffer (not shown) to other components of the computer system 1200. The input/output interface 1202 may be, for example, a display device, a keyboard, touch screen, joystick, trackball, mouse, monitor, speaker, printer, Google Glass® unit, web camera, any other computer peripheral device, or any combination thereof, capable of entering and/or viewing data.

Computer system 1200 includes one or more processors 1206, which may be a special purpose or a general-purpose digital signal processor configured to process certain information. Computer system 1200 also includes a main memory 1208, for example random access memory (RAM), read-only memory (ROM), mass storage device, or combinations of each. Computer system 1200 may also include a secondary memory 1210 such as a hard disk unit 1212, a removable storage unit 1214, or combinations of each. Computer system 1200 may also include a communication interface 1216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 1208, secondary memory 1210, communication interface 1216, or combinations of each, function as a computer usable storage medium, otherwise referred to as a computer readable storage medium, to store and/or access computer software including computer instructions. For example, computer programs or other instructions may be loaded into the computer system 1200 such as through a removable storage device, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 1214 or hard disc unit 1212 to the secondary memory 1210 or through the communication infrastructure 1203 to the main memory 1208 of the computer system 1200.

Communication interface 1216 allows software, instructions and data to be transferred between the computer system 1200 and external devices or external networks. Software, instructions, and/or data transferred by the communication interface 1216 are typically in the form of signals that may be electronic, electromagnetic, optical or other signals capable of being sent and received by the communication interface 1216. Signals may be sent and received using wire or cable, fiber optics, a phone line, a cellular phone link, a Radio Frequency (RF) link, wireless link, or other communication channels.

Computer programs, when executed, enable the computer system 1200, particularly the processor 806, to implement the disclosed methods according to computer software including instructions.

The computer system 1200 described may perform any one of, or any combination of, the steps of any of the methods according to the invention. It is also contemplated that the methods according to the invention may be performed automatically.

The computer system 1200 of FIG. 12 is provided only for purposes of illustration, such that the invention is not limited to this specific embodiment. It is appreciated that a person skilled in the relevant art knows how to program and implement the invention using any computer system.

The computer system 12800 may be a handheld device and include any small-sized computer device including, for example, a personal digital assistant (PDA), hand-held computing device, cellular telephone, or a laptop or netbook computer, mobile console, tablet, or similar hand held computer device, such as an iPad, iPad Touch or iPhone.

Exemplary Cloud Computing System

Figure 13:
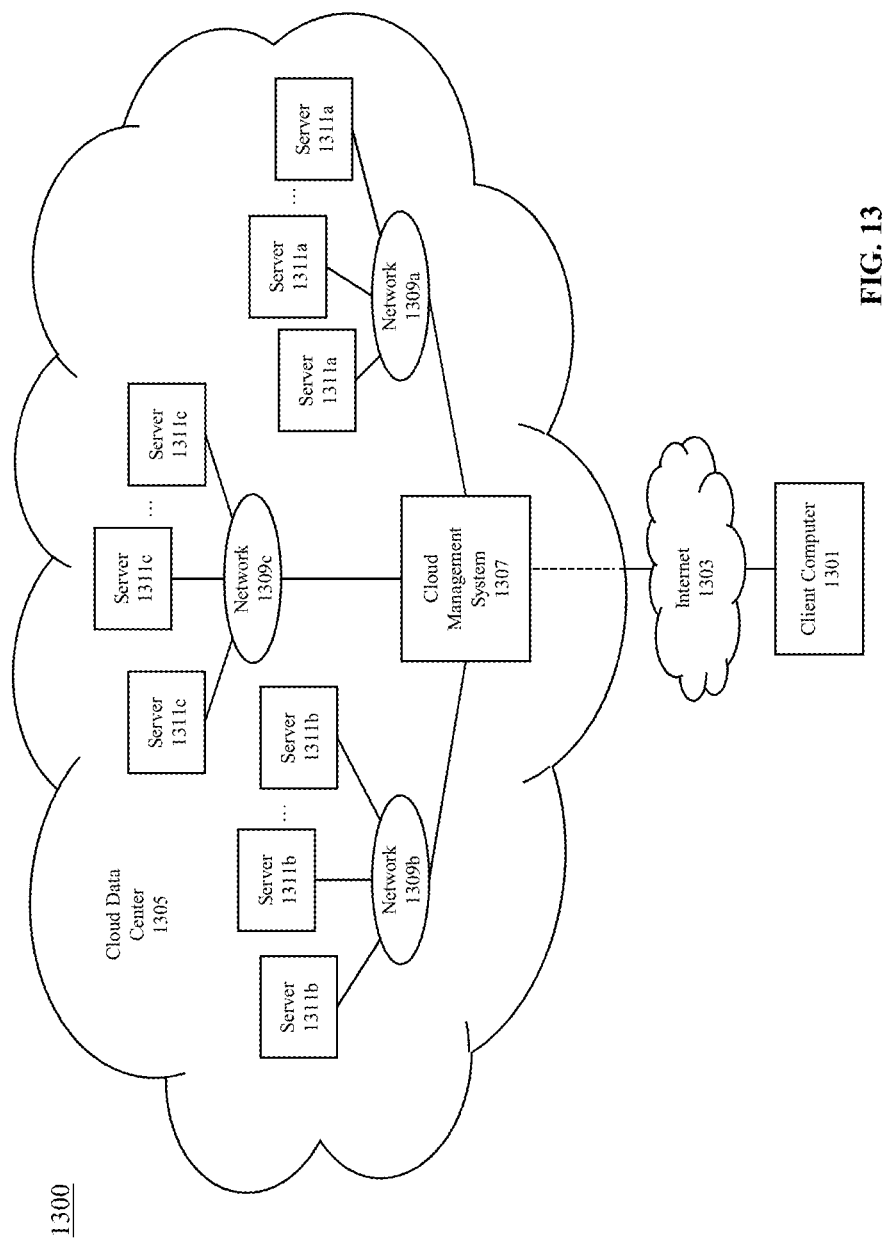
FIG. 13 is an exemplary cloud computing system that may be used for implementation of all or a portion of the invention.

FIG. 13 illustrates an exemplary cloud computing system 1300 that may be an embodiment of the present invention. The cloud computing system 1300 includes a plurality of interconnected computing environments. The cloud computing system 1300 utilizes the resources from various networks as a collective virtual computer, where the services and applications can run independently from a particular computer or server configuration making hardware less important.

Specifically, the cloud computing system 1300 includes at least one client computer 1301. The client computer 1301 may be any device through the use of which a distributed computing environment may be accessed to perform the methods disclosed herein, for example, a traditional computer, portable computer, mobile phone, personal digital assistant, tablet to name a few. The client computer 1301 includes memory such as random access memory (RAM), read-only memory (ROM), mass storage device, or any combination thereof. The memory functions as a computer usable storage medium, otherwise referred to as a computer readable storage medium, to store and/or access computer software and/or instructions.

The client computer 1301 also may include a communications interface, for example, a modem, a network interface (such as an Ethernet card), a communications port, a PCM-CIA slot and card, wired or wireless systems, etc. The communications interface allows communication through transferred signals between the client computer 1301 and external devices including networks such as the Internet 1303 and cloud data center 1305. Communication may be implemented using wireless or wired capability such as cable, fiber optics, a phone line, a cellular phone link, radio waves or other communication channels.

The client computer 1301 establishes communication with the Internet 1303—specifically to one or more servers—to, in turn, establish communication with one or more cloud data centers 1305. A cloud data center 1305 includes one or more networks 1309a, 1309b, 1309c managed through a cloud management system 1307. Each network 1309a, 1309b, 1309c includes resource servers 1311a, 1311b, 1311c, respectively. Servers 1311a, 1311b, 1311c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 1307 can comprise a dedicated or centralized server and/or other software, hardware, and network tools to communicate with one or more networks 1309a, 1309b, 1309c, such as the Internet or other public or private network, with all sets of resource servers 1311a, 1311b, 1311c. The cloud management system 1307 may be configured to query and identify the computing resources and components managed by the set of resource servers 1311a, 1311b, 1311c needed and available for use in the cloud data center 1305. Specifically, the cloud management system 1307 may be configured to identify the hardware resources and components such as type and amount of processing power, type and amount of memory, type and amount of storage, type and amount of network bandwidth and the like, of the set of resource servers 1311a, 1311b, 1311c needed and available for use in the cloud data center 1305. Likewise, the cloud management system 1307 can be configured to identify the software resources and components, such as type of Operating System (OS), application programs, and the like, of the set of resource servers 1311a, 1311b, 1311c needed and available for use in the cloud data center 1305.

The present invention is also directed to computer products, otherwise referred to as computer program products, to provide software to the cloud computing system 1300. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems (MEMS), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 1300 of FIG. 9 is provided only for purposes of illustration and does not limit the invention to this specific embodiment. It is appreciated that a person skilled in the relevant art knows how to program and implement the invention using any computer system or network architecture.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system for reporting use of content and preventing misuse, the system comprising:
a processor; and
a memory operatively coupled to the processor, the processor operative to:
receive content from a registered user, wherein the registered user is a creator of said received content;
process the content and assign a priority score to said content based on one or more parameters;
initiate a monitoring process to scan a network and identify use of the content;
record one or more identified instances of use of the content based on the monitoring process;
produce a report for output to said registered user including the one or more instances of use, wherein each identified instance of use is associated with one or more selectable actions, a location of the use, and a timestamp of the use, and wherein said one or more selectable actions include at least one of ignore identified instance, ignore domain, report improper use, request take-down, file copyright, and take legal action.

2. The system of claim 1, wherein additional features are available to registered users based on at least one of a paid subscription and a task completion.

3. The system of claim 1, wherein the processor is further operative to associate one or more safeguards to the content, said safeguards including at least one of a technical protection, functional protection, and legal protection.

4. The system of claim 1, wherein said one or more parameters for assigning the priority score is based on at least one of a susceptibility of the content and a classification of other content previously uploaded by the registered user.

5. The system of claim 1, wherein the content is processed, via an image processor, to determine an amount of bared skin as a percentage of a total amount of skin in the content.

6. The system of claim 1, wherein a frequency of the monitoring process corresponds to the priority score.

7. The system of claim 1, wherein the processor is further operative to execute said one or more selectable actions in response to an input from said registered user to address misuse of said received content.

8. The system of claim 1, wherein the processor is further operative to update preferences associated with the registered user in response to detecting selection of the one or more selectable actions.

9. The system of claim 1, wherein the processor is further operative to apply a visible watermark to said content according to features selected by said registered user.

10. The system of claim 9, wherein said features associated with said watermark include at least one of a size relative to said content and a color.

11. A method for reporting use of content and preventing misuse, the method comprising:
 receiving content from a registered user, wherein said registered user is a creator of said registered content;
 processing the content and assign a priority score to said content based on one or more parameters;
 initiating a monitoring process to scan a network for use of the received content;
 recording one or more identified instances of use of the content based on monitoring process;
 producing a report for output to the registered user including the one or more identified instances of use, wherein each identified instance of use is associated with one or more selectable actions, a location of the use, and a timestamp of the use, and wherein said one or more selectable actions include at least one of ignore identified instance, ignore domain, report improper use, request take-down, file copyright, and take legal action.

12. The method of claim 11, further comprising associating the registered user with one or more additional features based on at least one of a paid subscription and a task completion.

13. The method of claim 11, further comprising associating one or more safeguards to the content, said safeguards including at least one of a technical protection, functional protection, and legal protection.

14. The method of claim 13, wherein said assigning the priority score is based on at least one of a susceptibility of the content and a classification of other content previously uploaded by the registered user.

15. The method of claim 11, wherein said processing step further includes processing, via an image processor, the content to determine an amount of bared skin as a percentage of a total amount of skin in the content.

16. The method of claim 11, wherein said initiating step further includes determining a frequency of the monitoring process based on the priority score assigned to the received content.

17. The method of claim 11, wherein the processor is further operative to execute said one or more selectable actions in response to an input from said registered user to address misuse of said received content.

18. The method of claim 11, further comprising updating preferences associated with the registered user in response to detecting selection of the one or more selectable actions.

19. The method of claim 11, further comprising applying a visible watermark to said content according to features selected by said registered user.

20. The method of claim 19, wherein said features associated with said watermark include at least one of a size relative to said content and a color.

* * * * *